June 30, 1925.
C. H. VEEDER
HUB ODOMETER
Filed Nov. 18, 1924
1,544,079
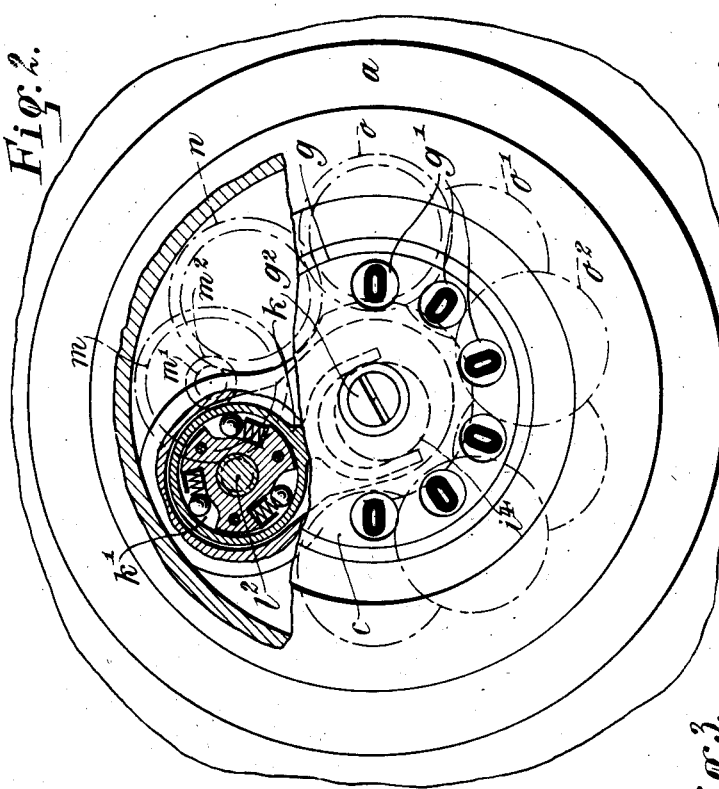
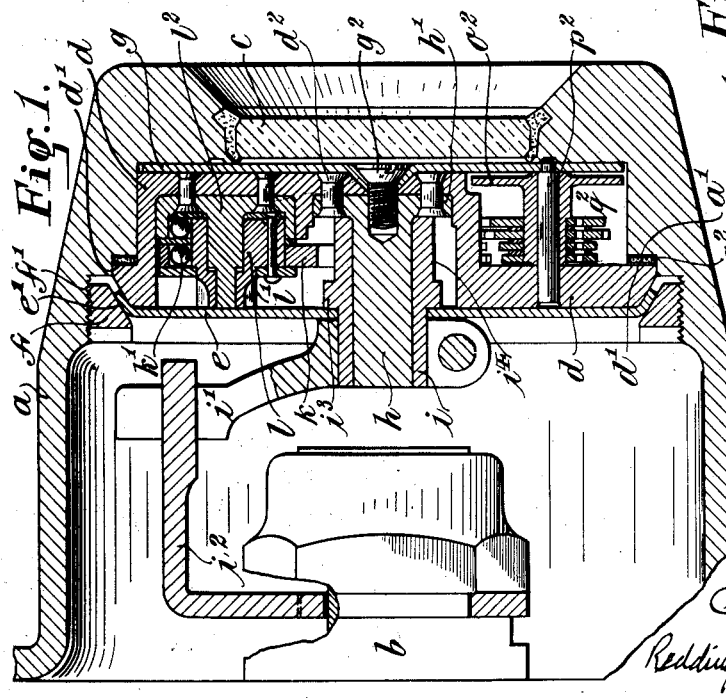
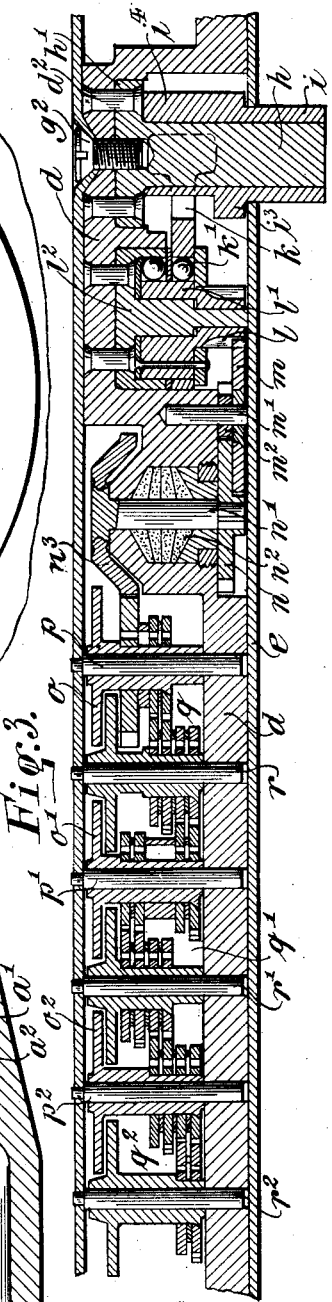
INVENTOR
Curtis Hursey Veeder
BY
Redding, Greeley, O'Shea Campbell
ATTORNEYS Patented June 30, 1925.

1,544,079

UNITED STATES PATENT OFFICE.

CURTIS HUSSEY VEEDER, OF HARTFORD, CONNECTICUT, ASSIGNOR TO THE VEEDER MANUFACTURING COMPANY, OF HARTFORD, CONNECTICUT, A CORPORATION OF CONNECTICUT.

HUB ODOMETER.

Application filed November 18, 1924. Serial No. 750,513.

*To all whom it may concern:*

Be it known that I, CURTIS HUSSEY VEEDER, a citizen of the United States, residing in Hartford, State of Connecticut, have invented certain new and useful Improvements in Hub Odometers, of which the following is a specification, reference being had to the accompanying drawings forming a part hereof.

This invention has for its object to improve the construction of odometers enclosed within the hubs of vehicle wheels, and particularly to reduce the wear and the power required to drive the registering devices and to reduce the liability to the forcing of heavy lubricant into the register when, as is often the case, the hub cap, before it is applied, is filled with heavy lubricant and is then screwed on tightly so that the lubricant is subjected to considerable pressure which tends to force it into the register mechanism as well as into the bearings. The invention will be described more fully hereinafter with reference to the accompanying drawings in which it is illustrated and in which—

Figure 1 is a view in axial section showing a hub cap with the improved odometer in position therein, and the driving device for the odometer.

Figure 2 is a view in end elevation as seen from the right hand in Figure 1, partly broken away and in transverse section.

Figure 3 is a developed section of the odometer mechanism.

The hub cap or adapter $a$, of any suitable form, is secured to and rotates with the vehicle wheel (not shown) which is mounted in the usual manner upon an axle, a portion of which is shown at $b$. The hub cap $a$ is suitably proportioned and recessed to receive the register mechanism hereinafter described the recess extending from the interior of the cap outward, the central opening in the outer end of the hub cap being closed by a glass plate $c$ to permit the register mechanism to be read from the outside.

The parts of the register mechanism are mainly supported by a frame $d$ which is fitted into the recess within the hub cap and has an annular shoulder $d'$ overlapping an internal annular shoulder $a'$ of the hub cap with a gasket $a^2$ interposed between the two shoulders to make a tight joint. The register mechanism is held in its seat and tight joints are assured by a circular plate $e$, preferably cupped or beveled at its edge as shown at $e'$ to conform to the beveled edge of the frame $d$, and to the beveled face of a nut $f$ which is threaded as at $f'$, into the recess of the hub cap, whereby side shaking of the register is prevented and the friction of the ring nut is increased so as to prevent it from coming loose and unscrewing. By this means the register mechanism is protected against the entrance of lubricant from the wheel bearings and all joints are closed tightly against the penetration of lubricant from the wheel bearings. The front or outer plate $g$ formed with sight openings $g'$ through which the figures on the number discs of the register may be read, is secured by a screw $g^2$ to the end of a stud $h$, the main frame $d$ being also secured by rivets $d^2$ to the flange $h'$ of the stud $h$.

The stud $h$ supports the tubular driving shaft $i$ which is rotated with the hub cap $a$ and with the vehicle wheel through an arm $i'$ fixed on the tubular shaft and engaged by an arm $i^2$ carried by the axle $b$. The tubular shaft has a close working fit in the plate $e$ and this joint is further protected by a shoulder $i^3$ on the shaft inside of the plate $e$ and by the hub of the arm $i'$ on the outside of the plate.

The tubular shaft is formed with or carries an eccentric $i^4$ for the purpose of oscillating the driving arm $k$ by which motion is imparted to the reduction gearing of the register mechanism, the driving arm being here shown as forked to engage the eccentric. For the purpose of adapting the odometer to wheels of different sizes, a driving shaft $i$ of such eccentricity as to give the proper degree of motion to the driving arm $k$, can be substituted readily or any other suitable means for securing the proper movement of the driving arm may be provided.

The driving arm $k$ engages through a slow speed ratchet mechanism, such as a ball clutch $k'$, the hub $l'$ of the first pinion $l$ of the train of reduction gearing, such pinion being mounted on a stud $l^2$ secured to the rear or axle face of the frame $d$. The pinion $l$ engages a gear $m$ mounted on a spindle $m'$ and carrying a pinion $m^2$ which meshes with a gear $n$ on a shaft $n'$ which passes through a stuffing box $n^2$ in the frame $d$ and bears, on the other side of the frame $b$, away from the axle a gear $n^3$. As will be noted the gear $n^3$ of the shaft $n'$ meshes directly with the gear of the first index wheel or disc $o$ and rotates at the same speed and slowly as compared with the first gear of the reduction gearing. The wear on the shaft $n'$ is therefore reduced greatly and the leakage of oil is prevented. It will be observed, also, that the reduction gearing is wholly on the inner or axle side of the frame $d$ and is protected by the plate $e$ against the forcing in of heavy lubricant, while the register discs $o$, $o'$, $o^2$, etc., mounted on spindles $p$, $p'$, $p^2$, etc., and driven from the gear $n^3$ through suitable transmission devices $q$, $q'$, $q^2$, etc., mounted on spindles $r$, $r'$, $r^2$, etc., and of usual or suitable construction not necessary to be described herein, lie on the outer side of the frame $d$ and are therefore further protected from the forcing of heavy lubricant.

I claim as my invention:

1. In a hub odometer having a hub cap formed with a recess extending from the inner end of the cap outward, a frame supporting the odometer mechanism arranged in said recess and a protecting plate at the inner side of the frame and odometer mechanism, means for securing the plate in position comprising a bevel formed on the inner face of the frame at its periphery, an outwardly inclined flange at the periphery of the protecting plate fitting the bevel on the frame and means for holding the inclined flange of the protecting plate against the beveled periphery of the frame consisting of a ring nut having its interior face beveled and having its exterior provided with means for engaging the interior of the cap.

2. In a hub odometer having a hub cap recessed to receive the odometer mechanism, a frame supporting the odometer mechanism, a driving shaft, and reduction gearing including a ratchet mechanism mounted on the inner face of the frame, register devices mounted on the outer face of the frame, a stuffing box in the frame, and a power transmitting shaft passed through the stuffing box and having at one end a gear in operative relation with the reduction gearing and ratchet mechanism and at the other end a gear in operative relation with the register devices.

3. In a hub odometer having a hub cap recessed to receive the odometer mechanism, a frame supporting the odometer mechanism, a driving shaft having an eccentric and reduction gearing, a driving arm in operative relation with the eccentric, register devices, and a clutch interposed between the driving arm and the first member of the reduction gearing.

This specification signed this 14 day of November A. D. 1924.

CURTIS HUSSEY VEEDER.